United States Patent [19]

Thomas

[11] 4,402,280
[45] Sep. 6, 1983

[54] ANIMAL CAGING SYSTEM

[76] Inventor: William R. Thomas, 325 W. Seventh St., Hazelton, Pa. 18201

[21] Appl. No.: 370,183

[22] Filed: Apr. 21, 1982

Related U.S. Application Data

[63] Continuation-in-part of Ser. No. 206,058, Nov. 12, 1980, Pat. No. 4,343,261, which is a continuation-in-part of Ser. No. 76,698, Sep. 18, 1979, abandoned.

[51] Int. Cl.$^3$ .............................................. A01K 1/03
[52] U.S. Cl. ....................................... 119/15; 119/17
[58] Field of Search ...................... 119/15, 17, 18, 19, 119/34; 128/1 R, 1 B

[56] References Cited

U.S. PATENT DOCUMENTS

| | | | |
|---|---|---|---|
| 2,702,503 | 2/1955 | Wildhaber | 98/33 |
| 2,703,570 | 3/1955 | Young, Jr. | 128/1 R |
| 3,196,834 | 7/1965 | Hall | 119/34 |
| 3,220,383 | 11/1965 | Bruner | 119/17 |
| 3,326,203 | 6/1967 | Goertzel | 128/1 B |
| 3,367,308 | 2/1968 | Quattrone et al. | 119/15 |
| 3,537,428 | 11/1970 | Montgomery | 119/18 |
| 3,557,756 | 1/1971 | Ramsey | 119/15 |
| 3,710,761 | 1/1973 | Gregory | 119/19 |
| 3,919,978 | 11/1975 | Schaefer | 119/19 |
| 3,924,571 | 12/1975 | Holman | 119/15 |
| 4,085,705 | 4/1978 | Gland | 119/17 |
| 4,089,571 | 5/1978 | Landy | 128/1 B |
| 4,249,482 | 2/1981 | Harr | 119/17 |

FOREIGN PATENT DOCUMENTS 462557 3/1937 United Kingdom .

OTHER PUBLICATIONS

Edwin P. Les, "Pressurized, Individually Ventilated and Individually Exhausted Caging", 48th Annual Report of the Jackson Laboratory, 1976-1977, p. 119.
Edwin P. Les, "Saving Space With Individual Cage Ventilation For Mice", 46th Annual Report of the Jackson Laboratory, 1974-1975, p. 106.
Edwin P. Les, "Evaluation of Pressurized Individually Ventilated Mouse Cages", 47th Annual Report of the Jackson Laboratory, 1975-1976, p. 106.

Primary Examiner—Hugh R. Chamblee

[57] ABSTRACT

An improved animal caging system of the type having a plurality of hollow boxes suspended on flanges from a plurality of ducted shelves is provided. The ducting for the ventilation system is entirely enclosed and is formed integrally with the caging system rack. A sliding valve member mounted in each lid is biased to seal air openings to the cage upon removal from the rack, a protrusion contacting the rack to uncover the air openings upon cage insertion. Similar valves are optionally placed in the rack to maintain balanced airflow when a cage is removed. The system minimizes the possibility of cross-infection between occupants of different cages, and between people and cage occupants.

7 Claims, 8 Drawing Figures

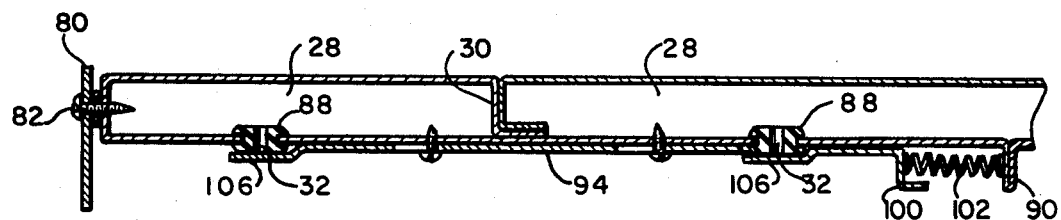
FIG. 5
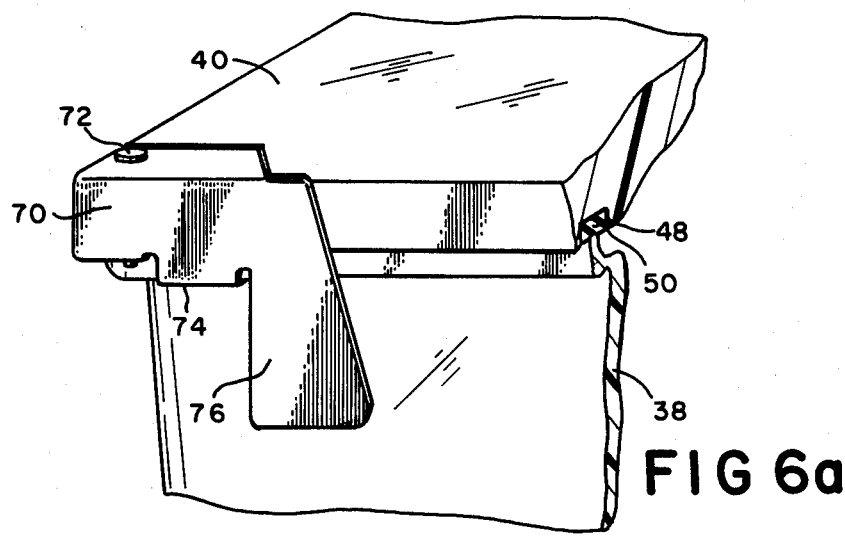
FIG 6a
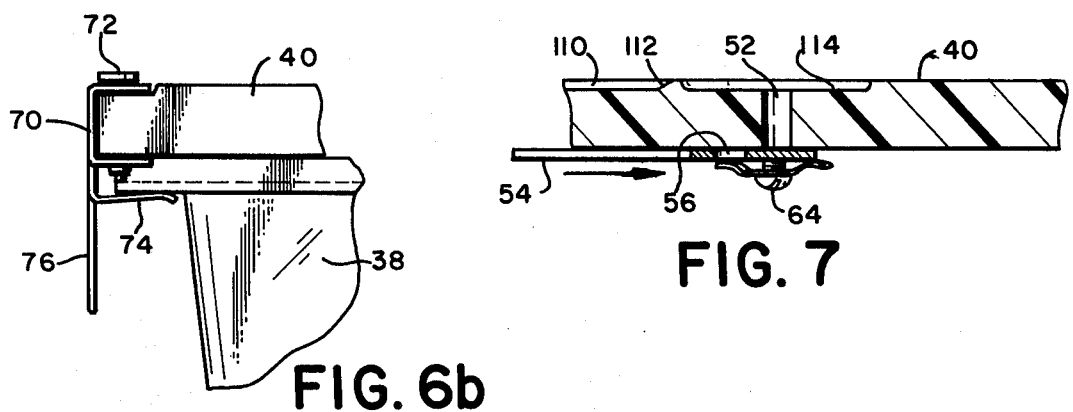
FIG. 6b
FIG. 7

ANIMAL CAGING SYSTEM

CROSS REFERENCE TO RELATED APPLICATION

This application is a continuation-in-part of application Ser. No. 206,058, filed Nov. 12, 1980 (now U.S. Pat. No. 4,343,261), which is a continuation-in-part of application Ser. No. 076,698, filed Sept. 18, 1979, now abandoned.

BACKGROUND OF THE INVENTION

1. Field of the Invention

This invention relates to the field of animal housing, and most advantageously to the housing of laboratory animals requiring isolation from contagion or isolation of contagion, using individually removable animal cage units.

2. Description of the Prior Art

In the art of housing animals, multi-compartment caging systems are employed for a variety of applications. These applications range from pet stores to demanding laboratory experimentation. Efficient use of space requires a compact living area and close storage of compartments. Problems that develop when confining a large number of animals in close proximity with one another include unpleasant odors, allergic reactions, inadequate air supply, cross-infection and difficulty with installation, removal and servicing of individual cage units.

In laboratory experimentation applications, animals are divided into a subject group and a control group, the subject group receiving a treatment under investigation while the control group is spared. When the subject group in an experiment is subjected to disease organisms, valid experimental results demand that the control group have absolutely no exposure to the disease in question. Even in situations not concerned with pathological diseases, completely pathogen-free animals are often required to reflect experimental results unaffected by stray pathogens. Multiple generations of animals having never been exposed to diseases, even through their ancestors, are therefore commonly bred. Production of such ultra-pure animals requires the ultimate in isolation.

Housing a large number of animals with even minimal degrees of isolation poses problems in supplying animals with basic needs such as air and food, as well as the problem of infection. In some prior art systems, banks of animal units have been individually fitted with pipe connections to supply and exhaust air, and sometimes to flush refuse from the animal housing unit. When a large number of animal units are mounted in a relatively small space, this maze of individual connections can be a nightmare for the person servicing the animals. This problem is only partially solved in systems that employ press-fit tube connections. On insertion of an animal unit into a system employing press-fit connections, the installer must visually line up the receptacle in the animal unit with the pipe in the rear of the mounting rack before the cage can be put in its final position. Inexact lineup of cages wastes supply air, may introduce pathogens, and may release contagion-bearing exhaust air. The complexity and inconvenience of individually piped systems therefore generates a substantial expense upon purchase and with continuing use.

In less demanding applications where some cross-ventilation can be tolerated, former animal housing systems have employed laminar flow ventilation. In laminar flow ventilation systems, a flow of air is supplied via a plenum over an entire bank of animal units having open tops. Theoretically, in such a system all the portions of cage ventilation air move parallel to all the other portions, out of the plenum and across the animal units. It is intended that each cage unit receive air directly from the plenum, and discharge air back into the flowpath without cross-ventilation to or from other units. Practically, the laminar flow ventilation method is not particularly effective at eliminating cross-ventilation. Discontinuities in the path of the air mass, including the animal compartments, generate eddy currents which preclude uniform air motion. Eddy currents and surface currents produce random swirling movements of air, sometimes directly opposite the movement of the larger directed air mass. This phenomenon is analogous to the way a canoeist can be more easily carried up river by staying close to the river bank.

Laminar air flow systems are usually designed to exhaust directly into the room. Persons allergic to the dander of laboratory animals, and all persons in installations where communicable disease experiments are carried out, must be equipped with personal protective equipment. If a plenum is used both on the air supply side and on the exhaust side, the animals will be enclosed and unobservable, and insertion and removal of animal units will be extremely inconvenient.

U.S. Pat. Nos. 4,249,842-Harr and 4,085,705-Gland et al attempt solutions to the cage ventilation problem using racks having hollow shelves comprising integral air ducts. The open-top cages are slideably suspended below the shelves on flanges. Openings in the shelves connect the air supply and/or exhaust to the inside of the animal compartment. While an advance over laminar flow systems, these systems are relatively open as no provision is made for seals or for closing cages upon removal.

It will be appreciated that problems with cross-ventilation and problems with convenience of installation and removal often involve a trade-off. If a system is completely airtight, installation and removal are likely to be inconvenient, requiring connection or disconnection of some sort of coupling. Conversely, a system which features convenience of installation and removal will generally do so at the expense of dependable, airtight couplings. The present invention seeks to provide a high performance airtight ventilation system that is nevertheless as convenient as a laminar flow system in ease of installation and removal of individual cage units.

The present invention provides a system whereby the cross-ventilation advantages of an individually-piped system are obtained, as well as the installation and removal convenience of a one-sided laminar flow system. In addition, the cage and/or the ventilation system are automatically sealed off when a cage is withdrawn. Each cage is therefore isolated at all times.

The system is widely applicable due to inexpensive yet sturdy and dependable construction. In simple embodiment, it is useful in pet stores and non-demamding laboratory work. In a strongly constructed unit, it is useful as a portable environment for shipping animals. In the most demanding laboratory contagious disease experiments, the full panoply of sealed cages and valves can be used. The total system can be employed to produce pathogen-free animals or to conduct communicable disease experiments, in addition to merely housing and transporting animals.

SUMMARY OF THE INVENTION

It is the object of this invention to provide a high density animal housing system that is as convenient to service as a laminar flow ventilated system, and as effective at reducing cross-ventilation as an individually piped system.

It is also an object of this invention to more effectively utilize available space for cages and for service of cages in a multi-unit cage system.

It is also an object of this invention to protect occupants of a multi-unit cage system from air that has had contact with occupants of other units, and from the dander, refuse and airborne contagion of such other occupants.

It is another object of this invention to ensure that the occupants of a multi-unit cage system and the human occupants of the area wherein such system is located do not suffer from diseases or allergic reactions caused by cross-ventilation between their air and that of their respective counterparts.

It is still another object of this invention to provide as airtight a fit as convenience will allow between the cages in a multi-unit caging system and the ducts supplying and exhausting air to and from said cages, while precluding the necessity of careful manual alignment of cages with the ducts.

These and other objects of this invention are accomplished by an animal housing system of the type having a plurality of cages slideably disposed on flanges depending from shelves in a rack, the shelves having integral air supply and air exhaust ducts communicating with an air source and an air discharge, the ducts opening to the cages disposed in the rack, the system comprising: a plurality of cage covers having openings aligned with the openings of the ducts when the cages are inserted in the rack, at least one spring-loaded sliding valve member for each cage cover, slideably mounted on the cage cover and having tabs to normally block the openings in the covers, the valve member having a protrusion extending to contact the rack upon partial insertion and to slide said tabs away from the openings upon full insertion of the cage.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 5 is a section view of the system rack, taken along line 5—5 in FIG. 3;

FIG. 6a is a partial perspective view of the corner of a cage, showing a corner clasp; and, FIG. 6b is an elevation view of the cage corner of FIG. 6a.

DETAILED DESCRIPTION OF THE PREFERRED EMBODIMENTS

Figure 1:
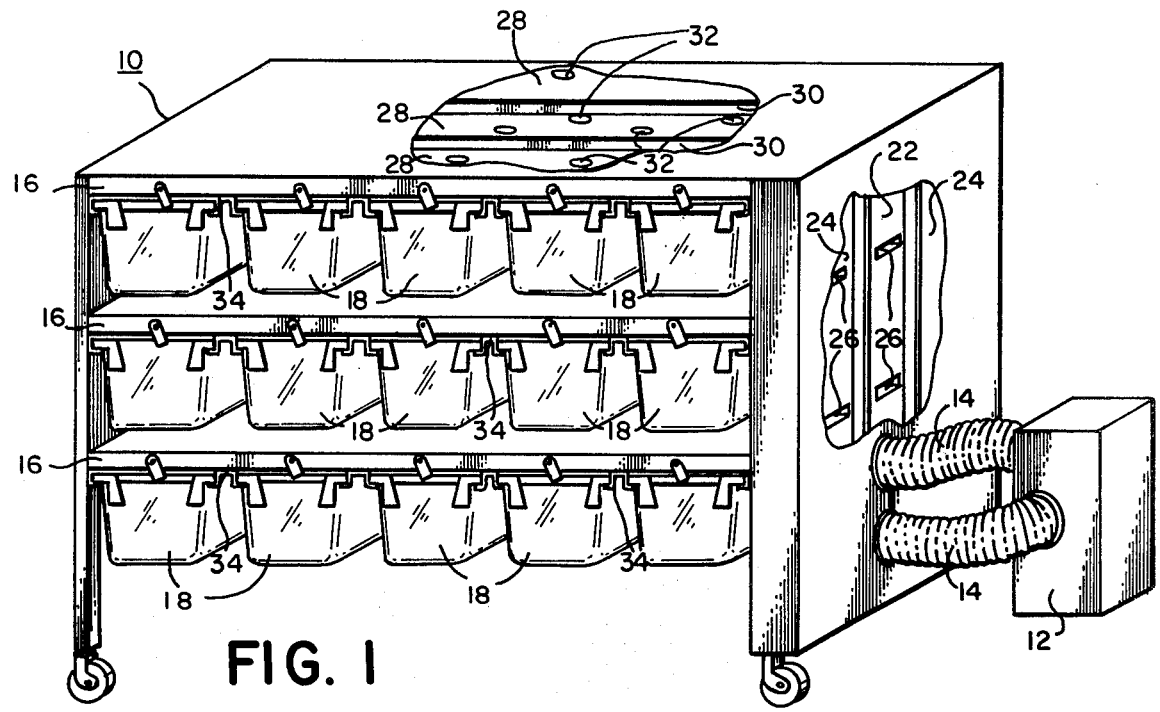
FIG. 1 is a perspective view of the complete system of the invention, the internal side and shelf ducting shown cut away.

FIG. 1 illustrates the multi-unit animal caging system of this invention. The device is adapted to house a plurality of animals, for example mice, in a controlled environment. A device of this general type is shown in my copending application Ser. No. 206,058, filed Nov. 12, 1980, and now U.S. Pat. No. 4,343,261, which is hereby incorporated by reference. In a multi-unit system of this kind, animal cages 18 are supported by a rack structure 10 having hollow shelves 16, for example by means of shelf flanges 34. The animal cages 18 are equipped with cage flanges 36 which cooperate with shelf flanges 34 such that the cages 18 can be slideably inserted and withdrawn. The system holds cages on both a front side as shown in FIG. 1, and a rear side, not shown.

An external ventilation apparatus 12 forces clean air into the system, and carries away used air. Apparatus 12 may be ducted into the rack via flexible hoses 14, 14, or the supply can be built into the rack structure 10, for example, in a hollow bottom. To minimize vibration, an external system as shown in FIG. 1 is preferred. The system's air input and exhaust may alternatively be connected to any appropriate source and to any appropriate discharge, for example, to a permanently-installed room ventilation plant.

The invention comprises complete duct work as an integral part of the structure supporting the cages. With reference to FIG. 1, air entering at ventilator 12 is filtered and ducted into the hollow side 20 of rack structure 10 via a flexible hose 14. Hollow end face 20 is internally divided into vertical air supply and exhaust ducts 22, 24 which connect via openings 26 with corresponding ducts 28 in the horizontal shelves 16 for supply and exhaust to cages 18. Exhaust air drawn from the ducts into ventilator 12 is filtered to remove particulate matter and ammonia, and is finally expelled into the room at exhaust opening 53. Two hollow end faces, one end face for air supply and an opposite end face for air exhaust, can be employed in place of single hollow end faces.

Each hollow shelf 16 is internally divided lengthwise into ducts by dividers 30 which run longitudinally the length of the shelf. The dividers may be separate parts attached inside the shelf, but it is preferred that shelf 16 be formed from only two pieces of sheet metal, as shown in FIG. 5. The ducts are formed by bending a piece of flat stock to form the shelf bottom, two sides and tops for the two outer ducts. A second, smaller piece of stock is bent to form the top of the central shelf duct, and the pieces are attached by sheet metal screws. This construction is inexpensive, yet ensures complete isolation between supply and exhaust. Resilient seals can be included along the seams for further protection.

The cage bodies 38 comprise flanges 36, extending outward along the upper edge of bodies 38. Matching flanges 34 are mounted under each shelf 16 such that the cages 18 can be slideably positioned under the shelves. Bodies 38 are open-top boxes of a material impervious to air, preferably transparent, such as polycarbonate.

Figure 2:
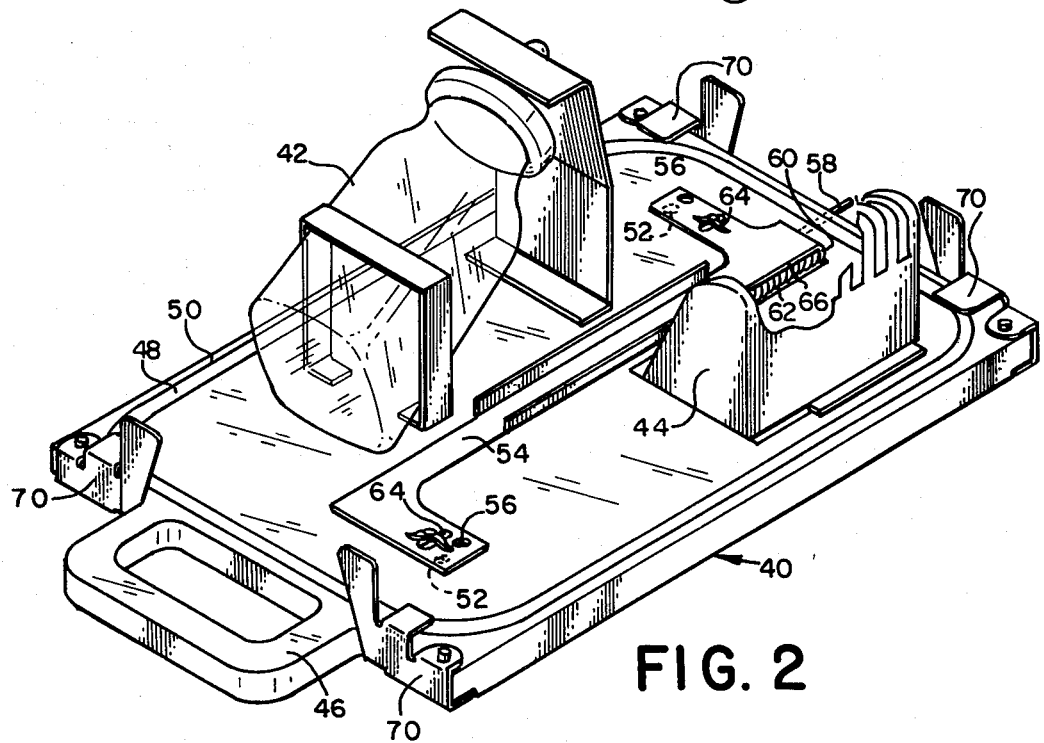
FIG. 2 is a perspective view illustrating the lower side (i.e., the inner side) of a cage lid according to the invention.
Figure 3:
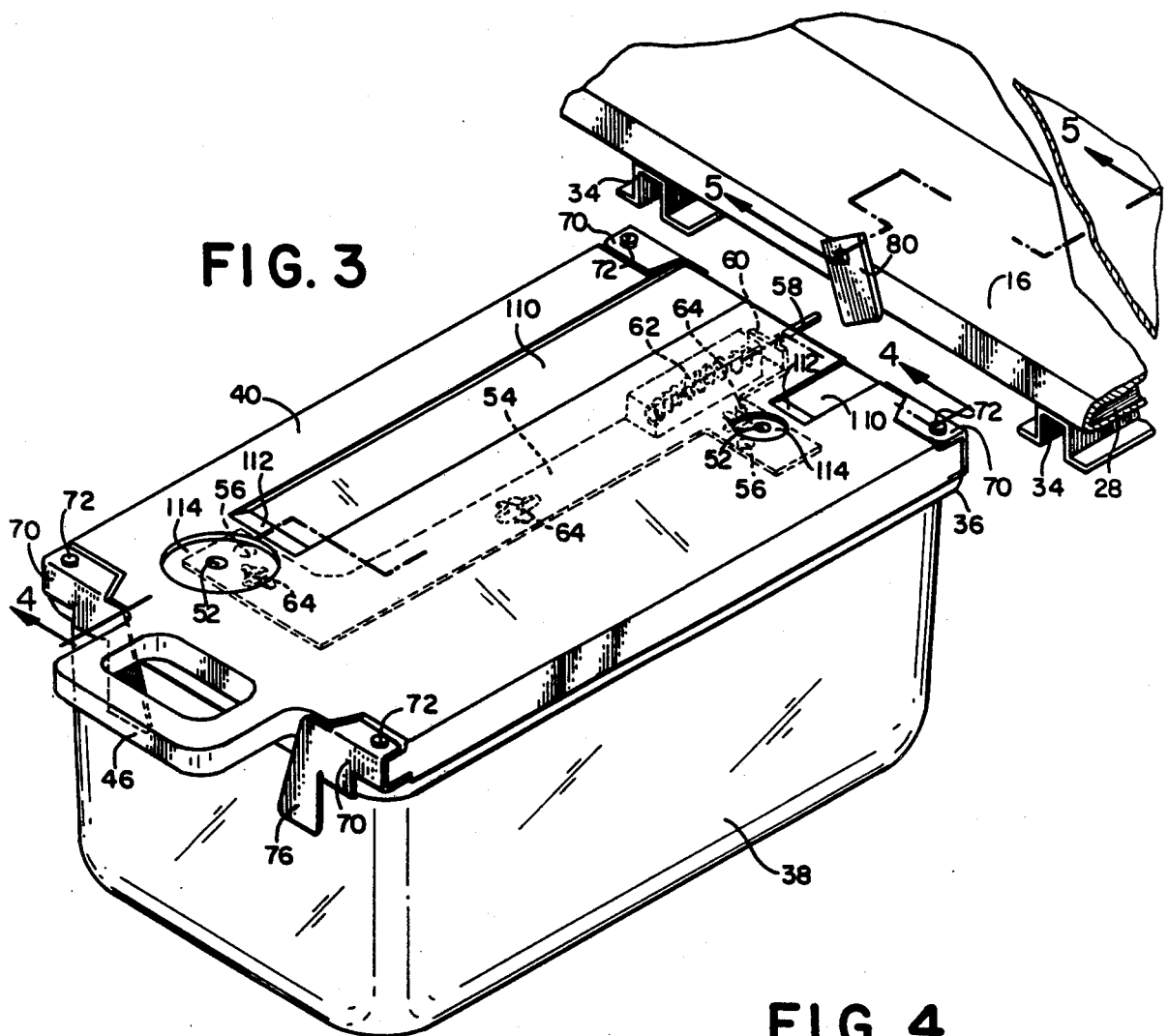
FIG. 3 is a perspective breakout view showing cage insertion.
Figure 4:
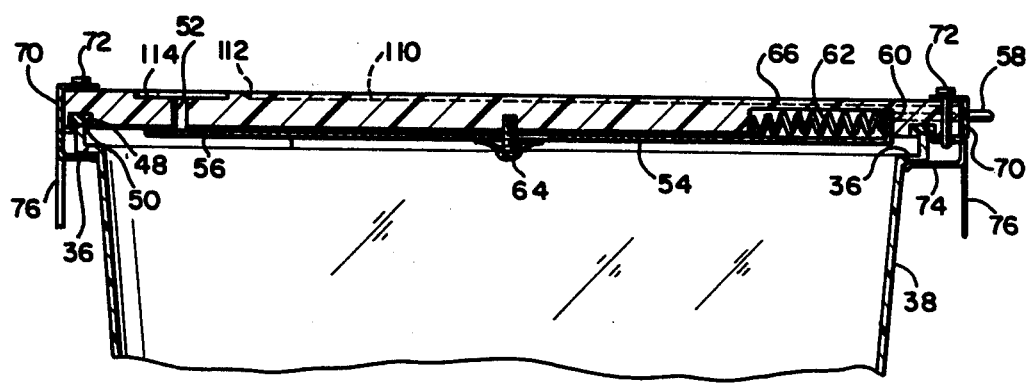
FIG. 4 is a section view along line 4—4 in FIG. 3.

The cages are equipped with lids 40 which include valves operative to open airflow between the cages and the shelf ducts upon cage insertion and to close airflow upon cage withdrawal. As shown in FIGS. 2–4, a cage lid 40 fits tightly over each cage. A cage lid seal ring 50 is mounted in groove 48 to ensure an airtight fit between cage lid 40 and the cage body, an upward extending edge of flange 36 on cage body 38 resting against the seal ring 50 in groove 48. Air controlling means comprising simultaneously operative intake valves and exhaust valves is disposed on the cage lid, the openings being in staggered relationship, to line up with openings 32 in the underside of shelf 16. Staggering the valves ensures that the input valve or any air therefrom will not cross the output opening, and vice versa, when the cage is inserted or withdrawn.

Cage lid 40 is compressed against flange 36 of cage body 38, and seal ring 50, by means of corner clasps 70. The corner clasps are pivotally mounted on pins 72 at each corner of the cage lid. The lid 40 is placed over body 38 such that flanges 36 rest against seal or gasket 50 in groove 48. As clasps 70 are pivoted closed, for example using finger tabs 76, flange 74 slides under flange 36 to compress flange 36 against gasket 50 in groove 48. Airtight connection between cage body 38 and lid 40 is therefore achieved. Inasmuch as the body as well as the lid are impervious to air, and since valve openings 52 are normally sealed, only a limited and isolated supply of air remains in the cage.

Air supply holes 52 are normally closed by slidig valve member 54, mounted on the underside of the cage lid. Sliding member 54 is biased by spring 62 which tensions the valves closed. Spring 62 rests in a groove 66 in the cage lid, pressing flange 60 of sliding member 54 away from one end of the groove. Slider 54 is flat except for upturned flange 60, and is slideably attached to the lid by screws 64 or the like passing through slots in slider 54, the slots defining the range of movement of the slider. Spring clips between the screws and slider urge the slider against the lid. Pusher bar 58 is attached to the slider, for example at flange 60, and extends slightly past the exterior edge of the cage lid through a bore in the cage lid. Upon cage insertion, pusher 58 contacts the rack, for example at a vertical protrusion 90, formed in the underside of shelf 16 at the extreme of travel of cage 18 (see FIG. 5). As the cage is pushed to full insertion, pusher 58 presses sliding bar 54 against the tension of spring 62, sliding openings 56 in the sliding member 54 into alignment with air openings 52 in the cage lid. Air openings 52 are therefore closed off by sliding member 54 unless the cage is fully inserted.

It will be appreciated that dual slider bars could be employed, one for supply and one for exhaust. In addition, the rack-contacting protrusion could be embodied in other ways, for example extending from the front of the lid and havig a bend to contact the front of the shelf.

Alternative air controlling means are possible, for use in various applications. Alternative valve arrangements in the cage lids can provide various degrees of sealing quality and therefore various degrees of isolation.

It is presently preferred that circular seals 88 be provided in each air opening in the shelves, to improve isolation. The seals extend from the shelves and, upon cage insertion, rest in depressions 114 surrounding corresponding air openings in the lids. To ease cage insertion over the seals 88, long grooves 110, ending in an incline 112, allow the cage to slide freely. At full insertion, the seal slides over incline 112 and rests in depression 114, which is somewhat shallower than groove 110. Seal 88 passing the incline also provides a tactile indication of full cage insertion.

In a system that leaks any air, control of differential air pressure is important. Moreover, it is difficult to prevent any leakage whatsoever. Accordingly, ventilator 12 should be provided with means to adjust the supply and exhaust pressures to as close a balance as possible. To provide maximum occupant protection, the supply pressure may be adjusted to exceed the exhaust vacuum, allowing any leakage of supply and cage air to flow into the room. To provide maximum protection to persons servicing the system, the exhaust vacuum is adjusted to exceed supply pressure, allowing any leakage of room air to flow into the cages.

Once balanced to the desired conditions, removal of a cage unit will remove part of the load on the ventilator, and may disturb the balance of supply and exhaust. If the supply and exhaust shelf ducts are left open to the room upon cage removal, part of the capacity of the ventilator will be wasted. Moreover, removal of a cage may expose occupants of the room to dander and contagion from the exhaust ducts because, as noted above, surface and eddy currents will often move some air opposite the general direction of flow. Apparatus to seal the uncovered shelf ducts upon cage removal can therefore be provided to improve the isolation of cage units if desired.

With reference to FIG. 5, a sliding valve arrangement analogous to that of the cage lids can be mounted on the shelves. The valves of FIG. 5 comprise solid tabs 106 attached to bar 94 and biased to seal holes 32 by spring 102 acting against flange 100. Upon cage isertion, cage lid 40 presses flange 100 against spring 102, sliding tabs 106 back from holes 32. Unlike the valve arrangement in the cage lids, the under-shelf valve must be quite thin in order to fit between the cage lid and shelf. A width slightly less than the protruding edge of seal ring 88 is preferred. In another alternative, a similar valve arrangement can be disposed within the hollow of the shelf, the valves likewise operable by insertion of the cage. However, great care must be taken to avoid cross-ventilation between the supply and exhaust ducts. The seals and close tolerances necessary to achieve an internally-mounted sliding valve may be overly expensive for most applications.

In addition to the foregoing, a simple filter may be employed in the air openings to prevent dander and bedding material from passing into the ducts or into the cages. The preferred and optimally effective embodiment comprises cage lids including a sliding valve and seal rings on the shelves adjacent the air openings.

The lid and various valve parts can be made of plastic or metal. It is presently preferred that the lid be a hard clear plastic such as polycarbonate. The sliding valve member and all parts exposed within the cage are preferably of stainless steel. As shown in FIG. 2, bottle 42 and food bin 44 may be supported on the lid along with the valve member. Handle 46 facilitates manual manipulation of the cage with attached lid. In a system for rodents, occupants are inclined to gnaw on any part which protrudes into the living space, thereby requiring that, absent a protective enclosing mesh or the like, the exposed parts must be made of a hard metal. Unless some part is available for gnawing, a confined rodent's health will be adversely affected as the teeth grow continuously.

External filtration and air impelling means as depicted in FIG. 1 are included in the presently preferred embodiment. Room air is blown through an input filter and filtered air is blown into the cage ducts via flexible hoses 14. The filter preferred is a HEPA filter (not shown) which will remove airborne particles down to about 2 or 3 microns. A similar filter is provided on the output side of the external ventilator means to remove dander and particulate material from air leaving the system. In addition, an activated charcoal filter is preferably included to remove ammonia from the exhaust. While rigid connection may be made between the external ventilator and the cage rack, flexible hoses 14 are preferred both for convenience in placement of the units and for better vibration isolation. Dampers can be included to control differential pressure.

The disclosed system is well suited for transporting as well as housing animals. Wheels provided on the rack structure and/or the external ventilation unit permit movement of the unit by merely pushing it around. To protect the flexible connecting hoses, a chain can secure the external ventilation unit to the rack structure. In addition to wheels, the ventilation unit can be easily equipped with a rechargeable battery and direct current fan motor for full mobility.

Further variations on the inventive concept disclosed herein are possible and will now be apparent to those skilled in the art. Reference should be made to the appended claims rather than the foregoing specification as defining the true scope of this invention.

What is claimed is:

1. An animal housing system of the type having a plurality of cages slideably disposed on flanges depending from shelves in a rack, the shelves having integral air supply and air exhaust ducts communicating with an air source and an air discharge, the ducts opening to the cages disposed in the rack, the system comprising:
    a plurality of cage covers having openings aligned with the openings of the ducts when the cages are inserted in the rack;
    at least one spring-loaded sliding valve member for each cage cover, slideably mounted on the cage cover and having tabs biased to normally block the openings in the covers, the valve member having a protrusion extending to contact the rack upon partial insertion and to slide said tabs to uncover the openings upon full insertion of the cage.

2. The animal housing system of claim 1, further comprising means for holding the cage in the rack against a biasing force exerted by the spring-loaded valve member.

3. The animal housing system of claim 1, further comprising a downwardly extending flange on each shelf at the extreme of cage travel, said protrusion contacting said downwardly extending flange.

4. The animal housing system of claim 3, further comprising seal rings disposed on the shelves, enclosing each air opening and extending from the shelves, the cage lids having depressions corresponding to the seal rings, whereby full insertion is tactilely indicated as the seal rings slide into the depressions.

5. The animal housing system of claim 4 wherein the cage lid is grooved along lines defined by the seal rings as the cage is inserted, whereby insertion is smooth and free of the seal rings until insertion is complete.

6. The animal housing system of claim 1, further comprising cage flanges for supporting the cages on the shelf flanges, said lids further comprising locking tabs pivotally attached to the cage lids, the locking tabs having flanges disposable over the cage flanges to attach the cage lids to the cages.

7. The animal housing system of claim 6, further comprising resilient sealing strips disposed between the cages and the lids, the locking tabs urging the cages and lids together over the resilient sealing strips.

* * * * *

UNITED STATES PATENT AND TRADEMARK OFFICE
CERTIFICATE OF CORRECTION

PATENT NO. : 4,402,280

DATED : September 6, 1983

INVENTOR(S) : WILLIAM R. THOMAS

It is certified that error appears in the above-identified patent and that said Letters Patent is hereby corrected as shown below:

Column 2, line 30, insert --Nos.-- before "4,085,705".

Column 2, line 62, delete "demamding" and insert --demanding--.

Signed and Sealed this

Fifth Day of March 1985

[SEAL]

*Attest:*

DONALD J. QUIGG

*Attesting Officer*     *Acting Commissioner of Patents and Trademarks*